United States Patent
Zimmerman et al.

(10) Patent No.: US 7,836,939 B2
(45) Date of Patent: Nov. 23, 2010

(54) NON-CONTACTING THERMAL ROTARY JOINT

(75) Inventors: Kurt Zimmerman, Indialantic, FL (US); Robert F. Meehan, Melbourne, FL (US); John Rust, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 204 days.

(21) Appl. No.: 11/832,178

(22) Filed: Aug. 1, 2007

(65) Prior Publication Data

US 2009/0032223 A1    Feb. 5, 2009

(51) Int. Cl.
    *F28D 15/00*    (2006.01)
(52) U.S. Cl. .................. 165/80.1; 165/104.19
(58) Field of Classification Search ............ 165/104.19, 165/104.28, 104.34, 86, 90, 168, 169, 170, 165/DIG. 139, DIG. 153, DIG. 156, DIG. 159, 165/DIG. 160, DIG. 161, 80.1; 277/360, 277/401, 408
See application file for complete search history.

(56) References Cited

U.S. PATENT DOCUMENTS

| | | | | |
|---|---|---|---|---|
| 2,332,700 A | * | 10/1943 | Dickson | 242/570 |
| 2,579,321 A | * | 12/1951 | Kadenacy | 60/39.39 |
| 2,980,403 A | * | 4/1961 | Ahlen | 165/90 |
| 3,253,300 A | * | 5/1966 | Gove et al. | 165/64 |
| 3,844,341 A | * | 10/1974 | Bimshas et al. | 165/86 |
| 4,055,220 A | * | 10/1977 | Stelwagen | 165/89 |
| 4,640,345 A | * | 2/1987 | Nishimura | 165/92 |
| 5,083,373 A | * | 1/1992 | Hamburgen | 29/890.03 |
| 5,299,090 A | | 3/1994 | Brady et al. | |
| 5,948,689 A | | 9/1999 | Hamburgen et al. | |
| 6,138,748 A | * | 10/2000 | Hamburgen et al. | 165/185 |
| 6,942,219 B2 | * | 9/2005 | Khonsari et al. | 165/86 |
| 7,040,386 B2 | | 5/2006 | Shimoya et al. | |

* cited by examiner

*Primary Examiner*—Teresa J Walberg
(74) *Attorney, Agent, or Firm*—Fox Rothschild, LLP; Robert J. Sacco

(57) ABSTRACT

An apparatus (100) for transferring heat from a first substrate (140) rotatably mounted to a second substrate (150). The apparatus (100) is comprised of at least a first fin ring (145) disposed concentrically on a first side surface (141) of the first substrate (140). A plurality of heat generating devices (130) is disposed on a second side surface (142) of the first substrate (140). There is at least a second fin ring (155) disposed concentrically on a first side surface (151) of the second substrate (150). The first fin ring (145) interleaves with the second fin ring (155) while allowing the first substrate (140) to rotate unobstructed relative to the second substrate (150). The second substrate (150) has at least a first port (160) for introducing moving air into a gap (G) defined between the first fin ring (145) and the second fin ring (155) for improving heat convection there between.

20 Claims, 8 Drawing Sheets

NON-CONTACTING THERMAL ROTARY JOINT

BACKGROUND OF THE INVENTION

1. Statement of the Technical Field

The invention relates to a non-contacting thermal rotary joint. More particularly, this invention relates to a non-contacting thermal rotary joint for transferring heat from heat generating devices disposed on a first substrate to a second substrate wherein the first substrate is rotatably mounted to the second substrate.

2. Background of the Invention

There are many applications where it is desirable or essential to transfer heat from a first substrate to a second substrate. The first substrate could have heat generating devices disposed thereon which generate heat which must be removed. It is desirable to transfer the heat to the second substrate which is disposed adjacent to the first substrate. The second substrate could be further thermally coupled to a heat sink for removing the heat from the second substrate.

In such applications, pin heat exchangers, liquid cooling, thermoelectric devices and/or heat pipes could be used to transfer the heat from the first substrate to the second substrate. Another example is found in U.S. Pat. No. 5,948,689 where there is provided a thermal coupling between a heat source and a heat sink comprised of an integrated interleaved-fin connector. A first substrate includes a first side surface and a second side surface. A plurality of heat generating devices are formed in the first side surface. A plurality of first channels are etched in the second side surface to form a plurality of first fins. A second substrate has a plurality of second channels etched therein to form a plurality of second fins and a base. The base is for thermally engaging with a heat sink. The first and second fins provide a thermally conductive path from the heat generating devices to the heat sink when interleaved with each other.

There are also many applications where it is desirable or essential to transfer heat from a first substrate to a second substrate across a rotary joint. For example, a satellite antenna typically includes several electronic components disposed on the rotating turntable supporting the antenna. The electronic components consume electrical power and generate heat which must be removed from the turntable or else the electronic components could be damaged. Since the turntable must rotate to align the antenna with a communications satellite, it can be difficult to remove the heat from the turntable. It is desirable to transfer the heat to the base which the turntable is rotatably mounted on. The satellite antenna could be located at a ground station, on a vehicle such as a truck, a ship, or an airborne vehicle such as an airplane, space vehicle, or satellite.

Another example of an application where it is desirable to transfer heat across a rotating joint includes a robotic arm and deployment mechanisms used in space. One or more electronic components mounted on a rotary substrate located at the distal end of the robotic arm generate heat which must be removed from the substrate. However, these examples are not meant to be limiting as there are may other applications known to one of ordinary skill in the art wherein it is desirable to transfer heat from a first substrate to a second substrate across a rotary joint.

It is known to use liquid rotary unions to transfer heat from a first substrate to a second substrate across a rotary joint. Drawbacks to the use of liquid rotary unions for this purpose are that they have a finite life, induce friction, and stiction and risk potential leaks which are particularly undesirable for satellite antennas such as small, precision antenna tracking positioners. Convection and radiation fins could be used but are limited in their effectiveness and efficiency in dissipating heat. The aforementioned thermoelectric devices and heat pipes have been considered but are not capable of transporting heat across a rotating joint. Moreover, thermoelectric devices can be used with a slip ring but at an increased size, weight, and cost.

In view of the forgoing, there remains a need for a device that can transfer heat from a first substrate to a second substrate across a rotary joint. In addition, such a device must be enduring, have low friction across the rotary joint, and reduce the stiction and leak risks making the device suitable for use in satellite antennas including small, precision antenna tracking positioners.

SUMMARY OF THE INVENTION

The invention concerns an apparatus having a non-contacting thermal rotary joint for transferring heat from a first substrate rotatable relative to a second substrate. The apparatus is comprised of the first substrate having a first side surface and a second substrate having a first side surface. The first substrate is rotatably coupled to the second substrate through a spindle and socket arrangement. The first side surface of the first substrate is disposed adjacent to the first side surface of the second substrate. The first substrate comprises a second side surface wherein heat generating devices are disposed.

There is at least a first fin ring defined concentrically on the first side surface of the first substrate. There is at least a second fin ring defined concentrically on a first side surface of the second substrate. The second fin ring is configured to interleave with the first fin ring and move relative to the first fin ring. The second fin ring is oriented adjacent to and substantially parallel to the first fin ring. There is a gap defined between the first fin ring and the second fin ring. The first fin ring, second fin ring and the gap collectively define a thermal transfer means configured for transferring thermal energy across the gap from the first fin ring to the second fin ring by radiation, conduction and convection.

In the one embodiment of the invention, the first substrate and the second substrate are comprised of a thermally conductive material. The thermally conductive material selected is aluminum. Aluminum is also highly desirable since the first fin ring and the second fin ring can be etched or machined directly into the first side surfaces of the first substrate and second substrate, respectively. The material selected is anodized to further improve the thermal radiation between the two substrates.

In one embodiment of the invention, there is a plurality of first fin rings defined concentrically on the first side surface of the first substrate. In addition, there is a plurality of second fin rings defined concentrically on a first side surface of the second substrate. The first fin ring and the second fin ring each have a predetermined height.

In another embodiment of the invention, the second substrate defines at least a first port configured for delivering a moving fluid such to the gap between the first fin ring and said second fin ring. The moving fluid is a gas such as moving air. The moving air is provided by a moving air source. The moving air source is coupled to the at least first port and is configured for communicating the moving air to the at least first port. The moving air is delivered to the gap between the first fin ring and the second fin ring for providing forced convection of heat from the first fin ring to the second fin ring as compared to the air being otherwise motionless. The second substrate defines at least a second port configured for exhausting the moving air from the gap.

In another embodiment of the invention, the second substrate defines two first ports configured for delivering moving air to the gap between the first fin ring and the second fin ring. The moving air is forced to travel through said gap and is distributed in both directions around said at least first fin ring and said at least second fin ring. The first fin ring and the second fin ring each have a first edge wherein the moving air exits the gap therebetween by radially bleeding over the first edges. In another embodiment of the invention, the predetermined height of the first fin rings and the second fin rings are varied or staggered between adjacent first fin rings and second fin rings to vary the radial leak rate of the moving air from the gap.

In another embodiment of the invention, the second substrate defines two first ports configured for delivering moving air to the gap between the first fin ring and the second fin ring and two second ports. The moving air exits the gap between the first fin ring and the second fin ring through the two second ports.

In another embodiment of the invention, moving air can be introduced at a first port while simultaneously pulling the air through an air exit port.

In another embodiment of the invention, the second substrate has a cooling loop defined therein configured for circulating a cooling fluid for removing heat the second substrate. In another embodiment of the invention, the second substrate is thermally coupled to a heat sink.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
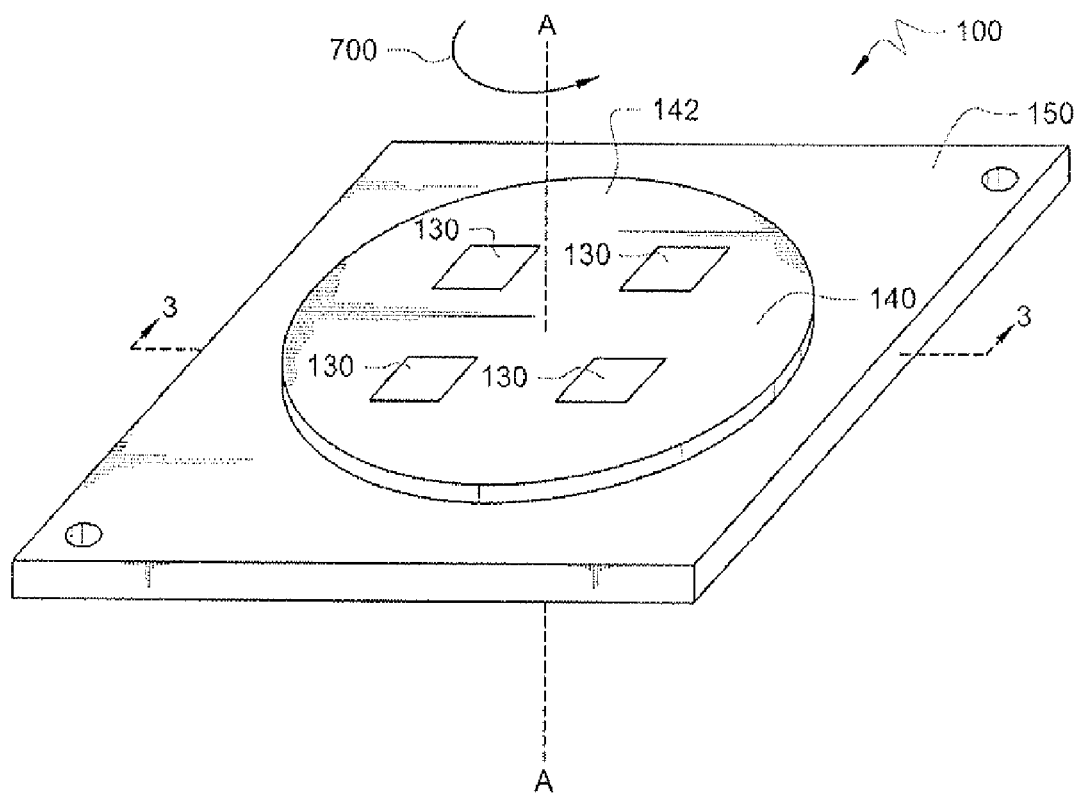
FIG. 1 is an elevated perspective view of an apparatus comprised of a first substrate rotatably mounted on a second substrate having a non-contacting thermal rotary joint.

Referring now to FIG. 1, shown is perspective view of an apparatus 100 comprising a first substrate 140 rotatably mounted to a second substrate 150. The first substrate 140 is rotatable relative to the second substrate 150 about a rotational axis A-A. In the embodiment of the invention shown in FIG. 1, the first substrate 140 is rotatable relative to the second substrate 150 about the rotational axis A-A in the direction of arrow 700. In another embodiment of the invention, the first substrate 140 is rotatable relative to the second substrate 150 about the rotational axis A-A in the direction opposite arrow 700.

The apparatus 100 is typically used in an application involving electronic equipment (not shown). In this regard, a plurality of thermal energy generating devices 130 could be disposed on a first or upper side surface 142 of the first substrate 140. The thermal energy generating devices 130 are devices including but not limited to electronic components, motors, or lasers that consume large amounts of electrical power and generate thermal energy or heat. The thermal energy must be removed from the first substrate 140 or the plurality of thermal energy generating devices 130 equipment (shown and not shown) could be damaged. In the embodiment shown in FIG. 1, the first substrate 140 and the second substrate 150 have a circular and square platform, respectively. However, the invention is not limited in this regard as the first substrate 140 and second substrate 150 could have a platform of any shape as is known to one of ordinary skill in the art.

It is desirable to transfer thermal energy from the first substrate 140 to the second substrate 150 for further removal. However, this is problematic since the first substrate 140 rotates relative to the second substrate 150 about the rotational axis A-A. The apparatus 100 solves this problem by transferring the thermal energy from the first substrate 140 to the second substrate 150 by means of a non-contacting thermal rotary joint. Since thermal energy travels through materials by conduction, and the amount of thermal energy conducted through a material depends on the composition of the material, the first substrate 140 and the second substrate 150 should be made from a material such as aluminum which is highly thermally conductive. However, the invention is not limited in this regard as any thermally conductive material known to one of ordinary skill in the art could be used. It is also desirable that the material be anodized in a color conducive for further improving the thermal radiation between the two substrates.

The second substrate 150 is usually mounted on a fixed mounting (not shown). The thermal energy can then be further transferred from the second substrate 150 to another heat sink (not shown) by various means.

One specific application where the apparatus 100 could be used is a satellite antenna (not shown). A satellite antenna (not shown) is typically mounted on a rotating turntable (not shown) such as the first substrate 140 to a base (not shown) such as the second substrate 150. The plurality of thermal energy generating devices 130 disposed on the first substrate 140 could be electronic components associated with the operation of the satellite antenna (not shown). The thermal energy generating devices 130 could include a receiver/transceiver, a high power amplifier (HPA), an antenna control unit (ACU), and a dc-to-dc (DC/DC) power supply. However, the invention is not limited in this regard as the apparatus 100 could be used in virtually any application known to one of ordinary skill in the art where it is desirable to transfer thermal energy from a first substrate 140 to a second substrate 150 across a rotary joint. These applications can include ground based applications, atmospheric applications at altitude, and space applications.

Figure 2:
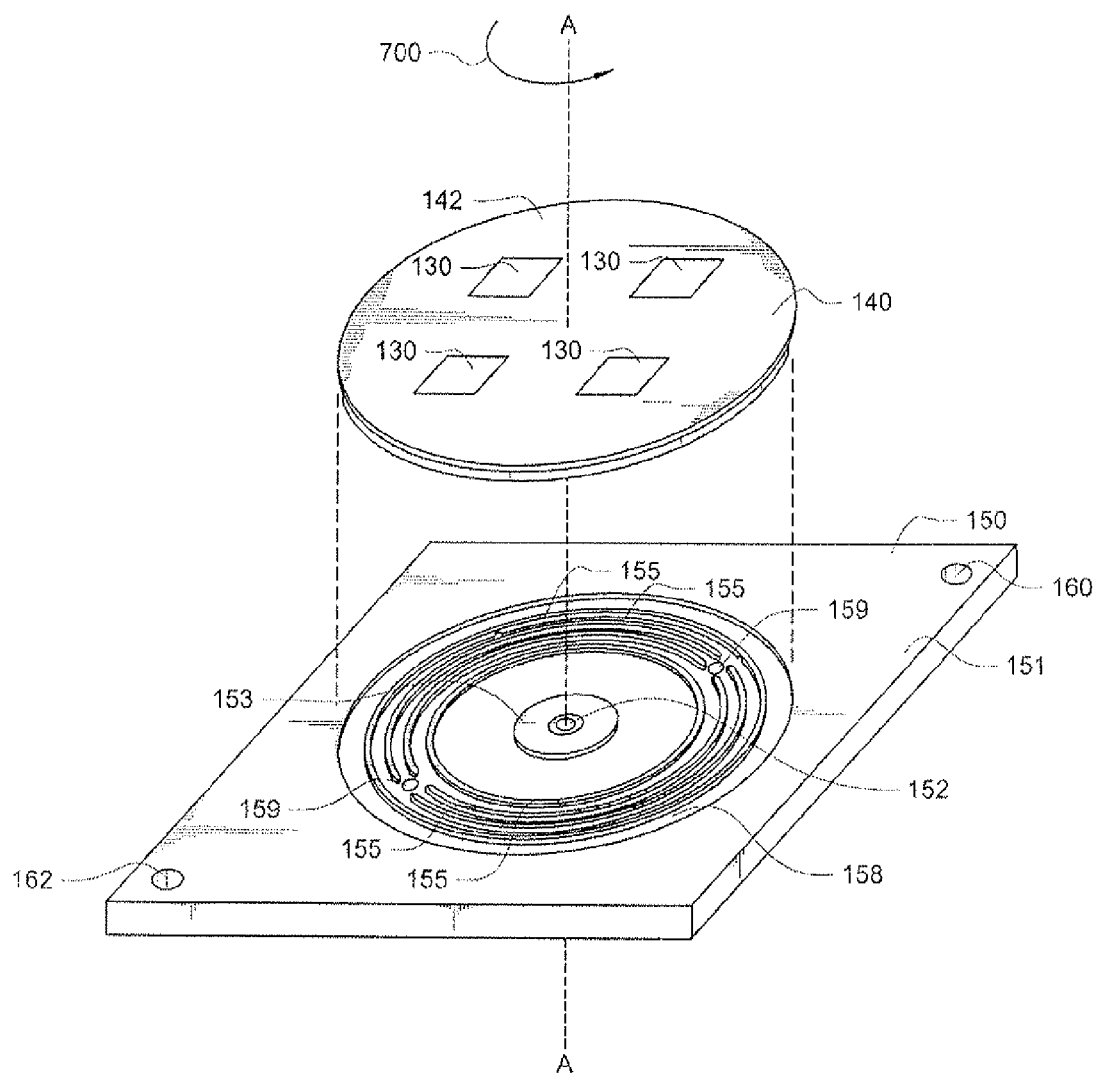
FIG. 2 is an elevated exploded perspective view of the apparatus of FIG. 1.

Referring now to FIG. 2, shown is an exploded perspective view of the apparatus of FIG. 1 wherein the first substrate 140 is exploded from the second substrate 150. In the preferred embodiment of the invention, a plurality of first fin rings 145 (FIG. 3) partially comprising the non-contacting thermal rotary joint is formed concentrically on a first side or lower surface 141 (FIG. 3) of the first substrate 140 directly beneath the plurality of thermal energy generating components 130. The plurality of first fin rings 145 (FIG. 3) are etched or machined directly into the first or lower side surface 141 (FIG. 3) of the first substrate 140. The etching or machining of the plurality of first fin rings 145 (FIG. 3) into the first or lower side surface 141 (FIG. 3) of the first substrate 140 is highly desirable since these methods readily admit to automation. For this reason, it is also highly desirable to select aluminum as the material for the first substrate 140 and second substrate 150 since aluminum can be etched and is capable of being machined.

Figure 3:
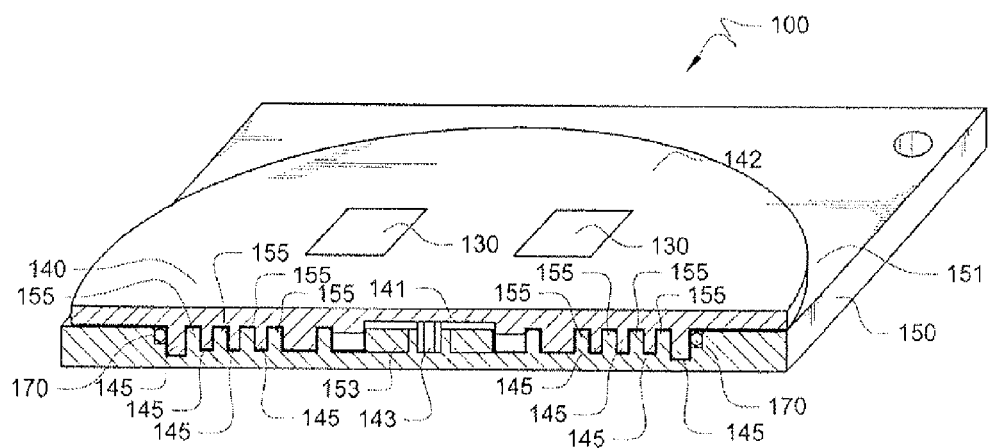
FIG. 3 is an elevated perspective cross-sectional view of the apparatus of FIG. 1 taken along line 3-3 of FIG. 1.

A plurality of second fin rings 155 also partially comprising the non-contacting thermal rotary joint are formed on a first side or upper surface 151 of the second substrate 150 which interleave with the plurality of first fin rings 145 (FIG. 3). The plurality of second fin rings 155 could also be machined or etched directly into the first or upper side surface 151 of the second substrate 150. Thus, when the first substrate 140 is rotatably mounted on the second substrate 150 about the rotational axis A-A (FIG. 1), the plurality of first fin rings 145 (FIG. 3) interleave with the plurality of second fin rings 155 such that the rotation of the first substrate 140 relative to the second substrate 150 in the direction of arrow 700 is unobstructed. In addition, since the plurality of first fin rings 145 (FIG. 3) and plurality of second fin rings 155 are non-contacting, there is no friction therebetween as the first substrate 140 is rotated relative to the second substrate 150. The plurality of first fin rings 145 (FIG. 3) and the plurality of second fin rings 155 provide a thermal path between the first substrate 140 and the second substrate 150.

In one embodiment of the invention, the plurality of first fin rings 145 (FIG. 3) and the plurality of second fin rings 155 are each comprised of four concentric fin rings. The diameter of the outermost first fin ring 145 (not shown) disposed on the first substrate 140 could be twenty-four (24) inches. The diameter of the innermost second fin ring 155 disposed on the second substrate 150 could be twenty-two (22) inches. Each first fin ring 145 (FIGS. 3 and 8) and second fin ring 155 (FIGS. 2 and 8) has a thickness T (FIG. 8) of one-tenth (0.1) of an inch and a height H (FIG. 8) of three-hundred-seventy-five thousandths (0.375) of an inch. The clearance C (FIG. 8) between the top edge 145a (FIG. 8) of each first fin ring 145 (FIG. 8) and the second substrate 150 (FIG. 8) and the top edge 155a (FIG. 8) of each second fin ring 155 (FIG. 9) and the first substrate 140 (FIG. 8) is fourteen-thousandths (0.014) of an inch. However, the invention is not limited in this regard as the number of first fin rings 145 (FIG. 3) and the second fin rings 155, the thickness T (FIG. 8), height H (FIG. 8) and clearance C (FIG. 8) can vary according to design requirements to provide as many interleaved fins as possible for the amount of thermal energy desired to be removed from the first substrate 140.

There is a hub 153 disposed at the center of the second substrate 150 having a socket 152 formed therein. The socket 152 is for receiving a spindle 143 (FIGS. 3 and 5) extending from the first or lower surface side 141 (FIGS. 3 and 5) of the first substrate 140.

Figure 5:
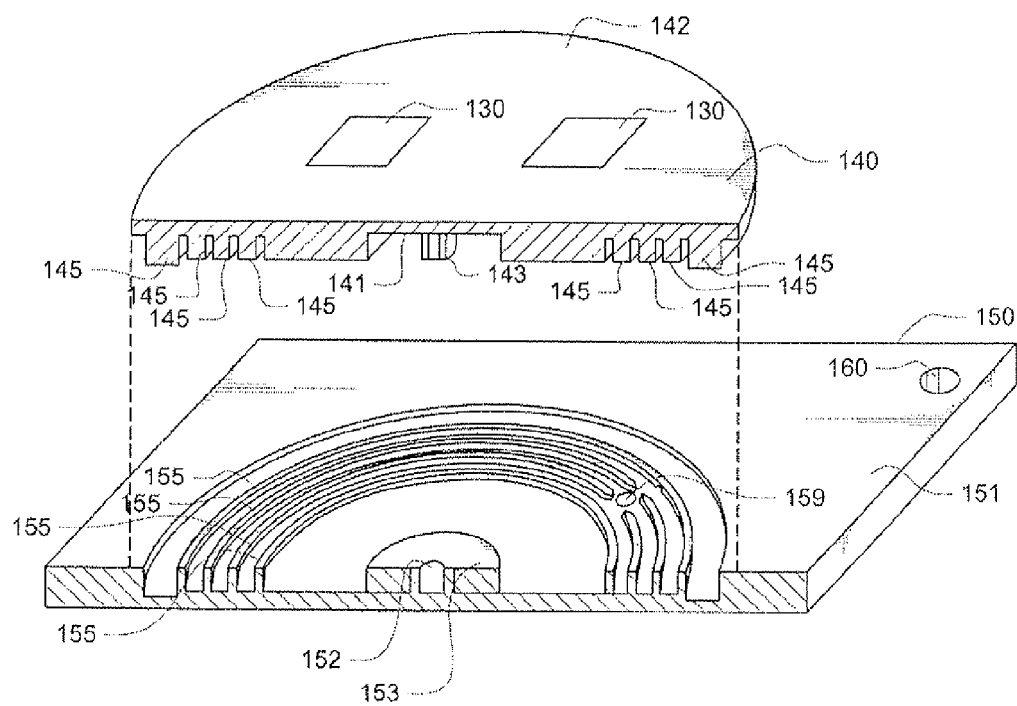
FIG. 5 is an exploded view of the elevated perspective cross-sectional view of FIG. 3.

Referring now to FIGS. 3 and 5, shown are a cross-sectional view of the apparatus of FIG. 1 taken along line 3-3 of FIG. 1 and an exploded view of FIG. 3, respectively. The first substrate 140 partially comprising the apparatus 100 is rotatably mounted on the second substrate 150 also partially comprising the apparatus 100. The first substrate 140 is rotatably mounted on the second substrate 150 via a spindle 143 and socket 152 (FIG. 2) arrangement. A plurality of first fin rings 145 defined in the first or lower side surface 141 of the first substrate 140 interleave with the plurality of second fin rings 155 defined in the first or upper side surface 151 of the second substrate 150. The plurality of first fin rings 145 is arranged concentrically on the first or lower surface 141 of the first substrate 140. The plurality of second fin rings 155 is likewise arranged concentrically on the first or upper side surface 151 of the second substrate 150.

Figure 4A:
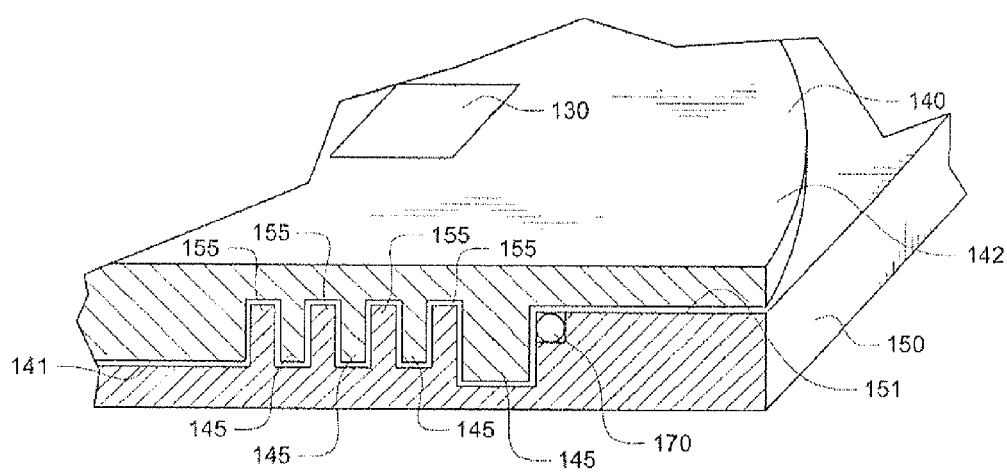
FIG. 4A is an enlarged cutaway portion of the elevated perspective cross-sectional view of FIG. 3 illustrating the first plurality of fin rings interleaving with the second plurality of fin rings comprising the non-contacting thermal rotary joint.

Referring now to FIG. 4A, and still referring to FIGS. 3 and 5, shown is an enlarged portion of the cross-sectional view of FIG. 3 illustrating the plurality of first fin rings 145 interleaving with the plurality of second fin rings 155. The plurality of fin rings 145 is defined on the first or lower side surface 141 of the first substrate 140 directly beneath the plurality of electronic components 130. The plurality of second fin rings 155 is defined in the first or upper side surface 151 of the second substrate 150 disposed directly beneath the plurality of first fin rings 145. The plurality of first fin rings 145 are precisely aligned with the plurality of second fin rings 155 so that the plurality of first fin rings 145 fit into the channels 156 (FIGS. 5 to 8) formed between adjacent second fin rings 155. The plurality of first fin rings 145 and the plurality of second fin rings 155 are interleaved and are aligned substantially parallel to one another (FIG. 8).

Also shown in FIG. 4 (see also FIG. 3) is an exemplary ball bearing 170 that is one of a plurality of ball bearings 170 radially disposed about the second substrate 150 for rotatably supporting the first substrate 140 on the second substrate 150.

The substantially parallel alignment of the plurality of first fin rings 145 and the plurality of second fin rings 155 provides a thermal path where thermal energy from the higher temperature first substrate 140 can flow to the lower temperature second substrate 150. The thermal energy generated by the plurality of electronic components 130 disposed on the second or upper side surface 142 of the first substrate 140 is conducted through the first substrate 140 to the plurality of first fin rings 145. In ground based and atmospheric applications, the thermal energy flows from the plurality of first fin rings 145 to the plurality of second fin rings 155 by a combination of radiation, conduction and convection. In space based applications, thermal energy flows from the plurality of first fin rings 145 to the plurality of second fin rings 155 by radiation only unless the apparatus 100 (FIG. 1) is equipped with means for providing forced convection. The means for providing forced convection include introducing moving air to transfer the thermal energy from the plurality of first fin rings 145 to the plurality of second fin rings 155. The plurality of second fin rings 155 further transfers the thermal energy to the second substrate 150 by conduction. This process is explained in further detail in the description for FIG. 8.

The plurality of first fin rings 145 interleaving with the plurality of second fin rings 155 provide a much larger surface area for transferring thermal energy from the first substrate 140 to the second substrate 150. The amount of thermal energy transferred is a function of several factors including the surface area the thermal energy is transferred from. The surface area of each of the plurality of first fin rings 145 available for transferring thermal energy is the circumference of each individual first fin ring 145 multiplied by the height of each individual first fin ring 145 multiplied by two since each first fin ring 145 is double-sided. Similarly, the surface area of each of the plurality of second fin rings 155 available for transferring thermal energy is the circumference of each individual second fin ring 155 multiplied by the height of each individual second fin ring 155 multiplied by two. The large surface area factor improves conduction in view of the generally poor thermal conductivity of air. This is even more desirable at high altitude where the air density and thermal conductivity of the air is lower. In addition, the large surface area factor significantly aids thermal energy transfer through radiation between the two substrates.

In another embodiment of the invention, the transmitted thermal energy can be further removed from the second substrate 150 by a cooling loop 180 (FIG. 8) which circulates a cooling fluid through the second substrate 150 (FIG. 8). Alternately, the transferred thermal energy can be further disposed of by dissipation, a heat sink, or other means known to one of ordinary skill in the art. The transfer of thermal energy from the first substrate 140 by the thermal path created by the plurality of first fin rings 145 and the plurality of second fin rings 155 to the second substrate 150 is discussed in more detail in FIG. 8.

Figure 6:
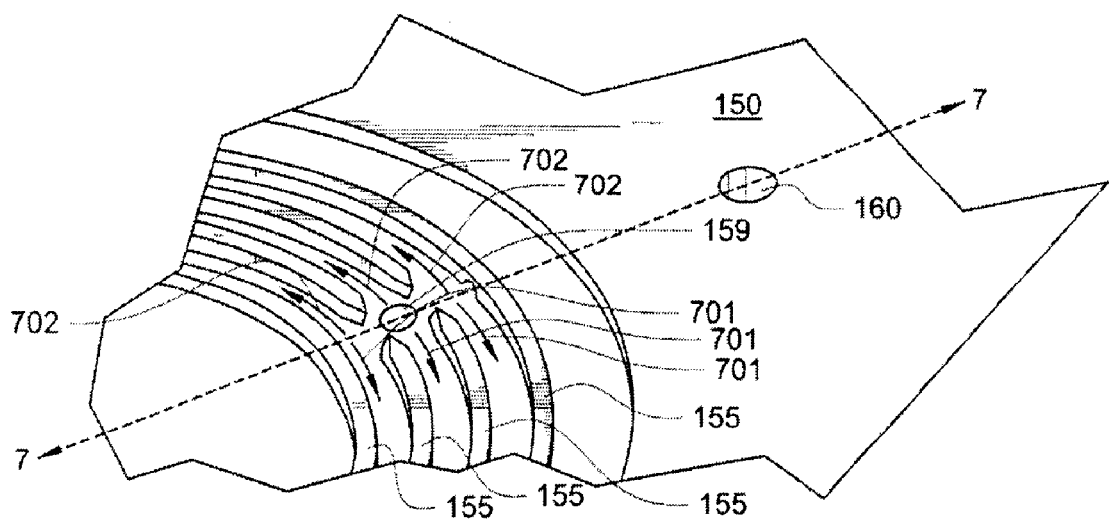
FIG. 6 is a cutaway portion of the second substrate shown in FIG. 5.

Referring now to FIG. 6, shown is a cutaway portion of the second substrate 150 of FIG. 5. In the embodiment of the invention, a moving fluid is used to provide for the forced convection of thermal energy between the plurality of first fin rings 145 (FIGS. 3 to 5) and the plurality of second fin rings 155. It is known to one of ordinary skill in the art that a moving fluid results in forced convection of thermal energy between a body at a higher temperature and a body at a lower temperature. The moving fluid could be any gas known to one of ordinary skill in the art. The gas could be moving air. For the purposes of explanation in the present invention, the gas is moving air. The moving air is directed into the gap G (FIG. 8) defined between each of the plurality of first fin rings 145 (FIG. 3) and the plurality of second fin rings 155. The moving air is introduced into an air inlet port or first port 160 formed in the first substrate 150. The moving air can be provided from an air compressor, air pump, fan, compressed air source or other means known to one of ordinary skill in the art.

Figure 7A:
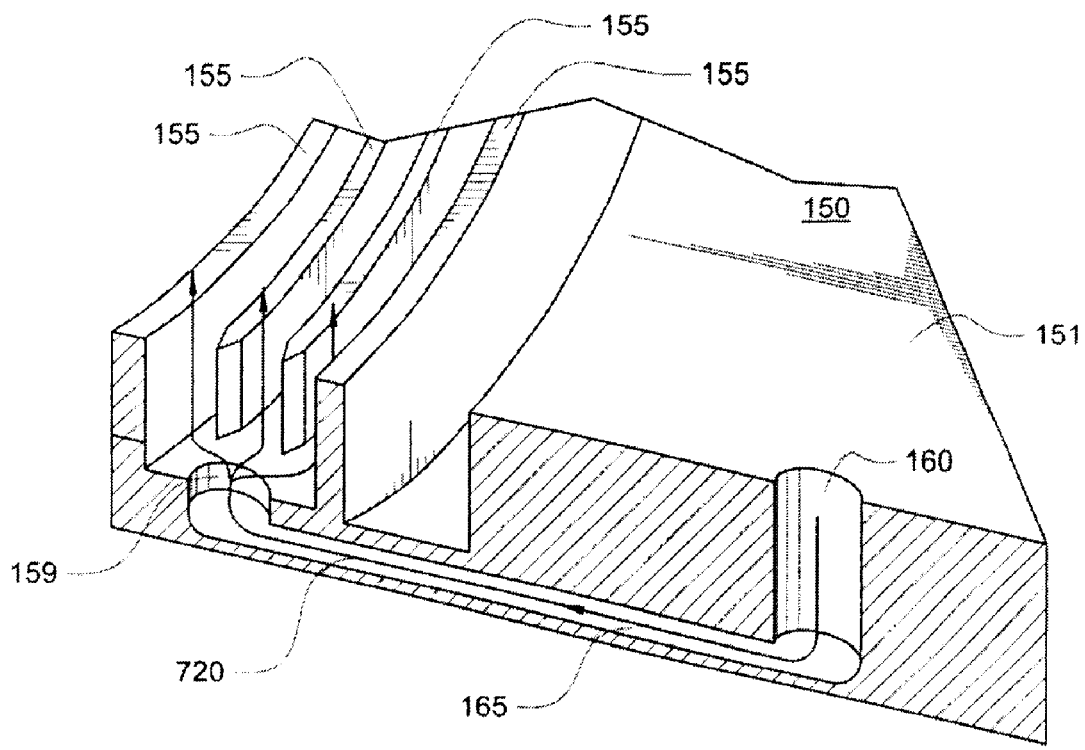
FIG. 7A is a cross-sectional view of a cutaway portion of the second substrate taken along line 7-7 of FIG. 6.
Figure 8:
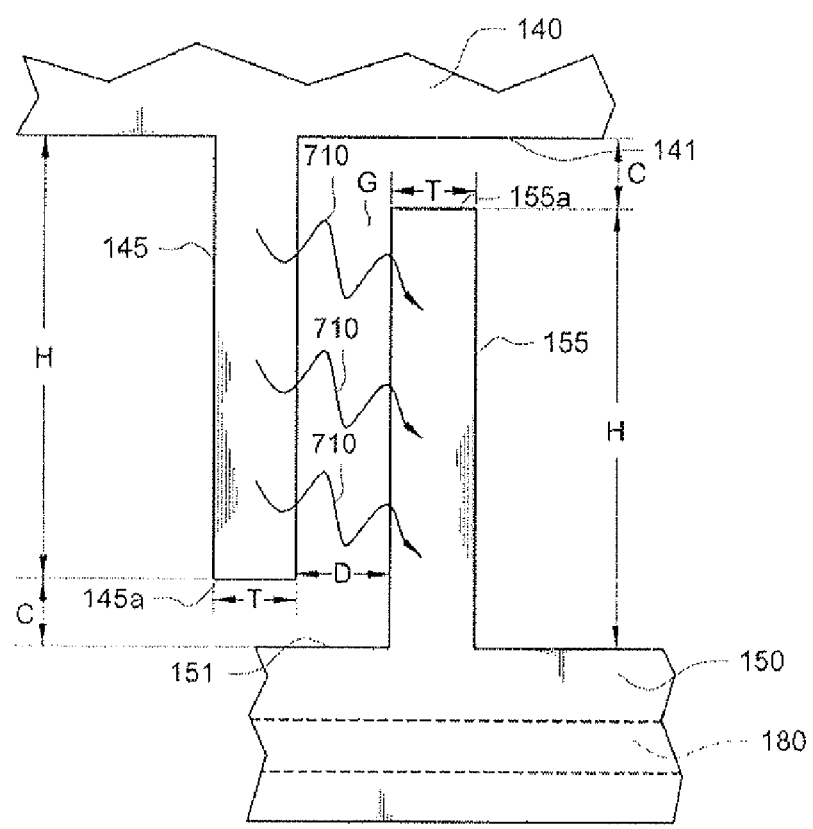
FIG. 8 is an enlarged cross-sectional view of an exemplary fin from the first plurality of fins disposed adjacent to an exemplary fin from the second plurality of fins comprising the non-contacting thermal rotary joint.

Still referring to FIG. 6 but now also to FIG. 7A, the moving air is transmitted through a channel 165 formed in the second substrate 150 and in fluid communication with the first port 160. In FIG. 7A, the moving air is represented by the arrow 720. The channel 165 is also in fluid communication with an air exit port 159 defining an opening into the gap G (FIG. 8) defined between the plurality of first fin rings 145 (FIG. 3) and the plurality of second fin rings 155 formed in the second substrate 150. The moving air is distributed in both the clockwise and the counter-clockwise direction. Thus, the moving air is forced to pass through the gap G (FIG. 8) between adjacent first fin rings 145 (FIG. 8) and second fin rings 155 in the clockwise and counter-clockwise directions. The clockwise direction of the moving air is represented by arrows 701. The counter-clockwise direction of the moving air is represented by arrows 702. Alternately, moving air can be introduced at the air inlet port or first port 160 while simultaneously pulling the air through the air exit port 159. Air can be pulled through the air exit port 159 by any means known to one of ordinary skill in the art.

After the moving air has finished its path of travel, which in the embodiment of the invention is one-half of the circumference of the first and second fin rings 145, 155 (see FIG. 2), the moving air exits from the gap G (FIG. 8) between the adjacent first and second fin rings 145, 155 through an air exit port or second port 162 (FIG. 2). The second port 162 (FIG. 2) is disposed in the second substrate 150 on the opposing side of the second substrate 150 diagonally opposed from the first port 160 (see also FIG. 2). The second port 162 (FIG. 2) is in fluid communication with the gap G (FIG. 8) defined by the space between the adjacent first and second fin rings 145, 155 (FIG. 8) by a channel 165 (similar to that shown in FIG. 7A). The channel 165 (not shown) is in fluid communication with a third port 159 (FIG. 2) defining an opening into the gap G (FIG. 8) defined between each of the adjacent second fin rings 155.

In the embodiment of the invention, the moving air is introduced at first port 160 at a pressure selected to provide low volume airflow through the gap G (FIG. 8) defined by adjacent first fin rings 145 (FIG. 8) and said second fin rings 155 (FIG. 8). In ground and atmospheric applications, the low volume airflow provides for forced convection of thermal energy from the first plurality of fin rings 145 (FIG. 3) to the second plurality of fin rings 155 as compared to the natural convection of thermal energy therebetween with the air being motionless. In space applications, the low volume airflow provides for forced convection of thermal energy from the first plurality of fins 145 (FIG. 3) to the second plurality of fins 155 as compared to there otherwise being no natural convection of thermal energy in the vacuum of space.

In another embodiment of the invention, the moving air is introduced at the first port 160 at a pressure selected to provide high volume airflow through the gap G (FIG. 8) defined by adjacent first fin rings 145 (FIG. 3) and said second fin rings 155. In ground and atmospheric applications, the higher volume air flow provides for a higher rate of forced convection of thermal energy between the adjacent first fin rings 145 (FIG. 3) and the second fin rings 155 (FIG. 8) as compared to the lower volume of air flow or the natural convection of thermal energy therebetween with the air being motionless. In space applications, the higher volume airflow provides for improved forced convection of thermal energy from the first plurality of fin rings 145 (FIG. 3) to the second plurality of fin rings 155.

Figure 4B:
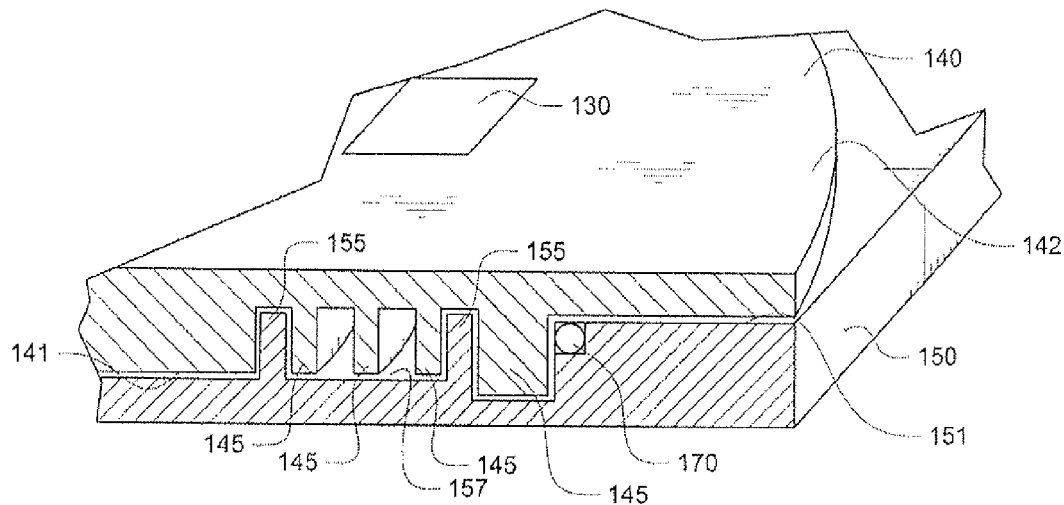
FIG. 4B is an enlarged cutaway portion similar to FIG. 4A of another embodiment of the apparatus of FIG. 3 illustrating a first plurality of fin rings on the first side surface of the first substrate interleaving with the channel defined in the second substrate comprising the non-contacting thermal rotary joint.

Referring now to FIG. 4B, shown is another embodiment of the apparatus of FIG. 3 showing a cutaway portion of an elevated perspective cross-sectional view of view similar to FIG. 3. There is a plurality of first fin rings 145 defined on the first or lower side surface 141 of the first substrate 140 directly beneath the plurality of electronic components 130. There is only a pair of second fin rings 155 on the second substrate 150 defining a channel 157 wherein the plurality of first fin rings interleave. The intervening plurality of second fin rings 155 have been eliminated to improve the flow of moving air introduced at first port 160 in channel 157. This configuration is especially desirable in forced air systems used in ground applications.

Figure 7B:
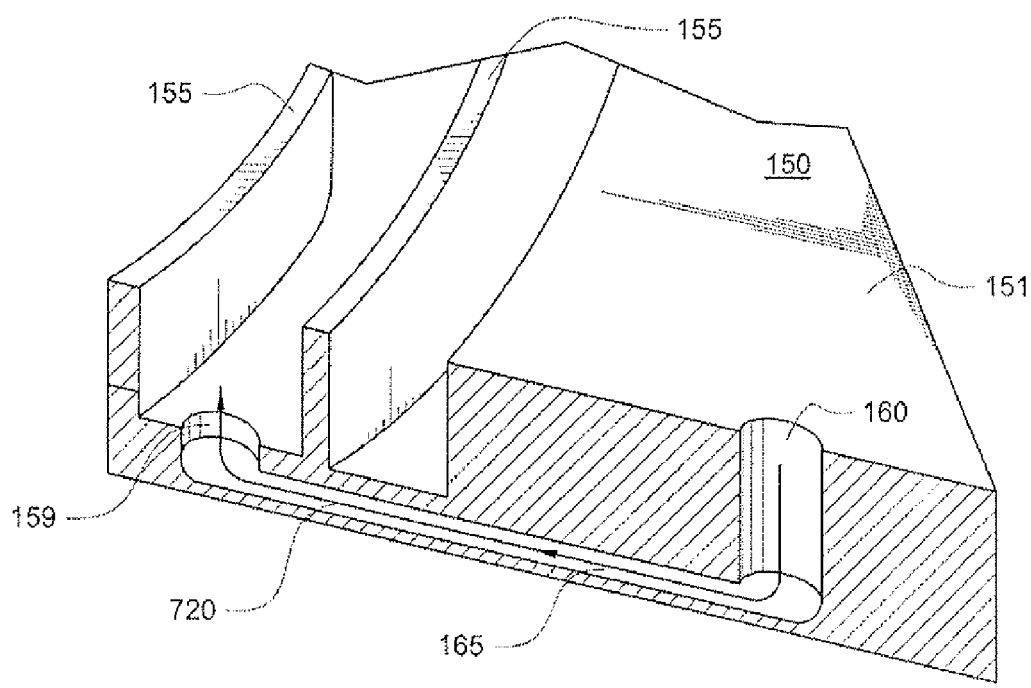
FIG. 7B is a cross-sectional view of a cutaway portion of the second substrate taken along line 7-7 of FIG. 6 of the embodiment of the apparatus corresponding to FIG. 4B.

Still referring to FIG. 4B but also to FIG. 7B, shown is a cutaway portion of the second substrate 150 corresponding to the embodiment of the apparatus shown in FIG. 4B. As previously discussed, there is a pair of second fin rings 155 defined on the second substrate 150 defining a channel 157 for interleaving with the first plurality of fin rings 145 (FIG. 4B) defined on the first substrate 140. The absence of additional second fin rings intervening between the foregoing pair of second fin rings 155 results in an improved flow rate of moving air introduced at first air port 160. The moving air is directed through channel 165 in the direction of arrow 720 to an air exit port 159 defining an opening into the channel 157. The moving air is distributed in both the clockwise and the counter-clockwise direction. The improved flow rate of the moving air improves the forced convection of thermal energy from the first substrate 140 to the second substrate 150. The flow rate of the moving air is improved because the absence of the additional second fin rings between the pair of fin rings 155 eliminates restrictions to the flow of moving air which would otherwise result in lower pressure airflow. The improved flow rate results in improved forced convection of thermal energy from the first plurality of fin rings 145 defined on first substrate 140 to the second substrate 150.

In addition, with the elimination of the intervening plurality of second fin rings between the pair of second fin rings 155, it is no longer necessary for the plurality of first fin rings 145 to interleave with the eliminated second fin rings. As a result, the plurality of first fin rings 145 can have varying fin geometry as is known to one of ordinary skill in the art. For example, the plurality of first fin rings 145 can be wavy, pin, or offset staggered fins as is known to one of ordinary skill in the art.

Referring now particularly to FIG. 8, shown is a cross-section of an exemplary first fin ring 145 disposed adjacent to and substantially parallel to a cross-section of an exemplary second fin ring 155. There is a gap G having a distance D between the exemplary first fin ring 145 and the exemplary second fin ring 155. The flow of the thermal energy being transferred from the exemplary first fin ring 145 to the exemplary second fin ring 155 is shown by the arrows 710. As previously discussed, in ground based or atmospheric applications, the transfer of thermal energy from the exemplary first fin ring 145 to the exemplary second fin ring 155 occurs through a combination of radiation, conduction and convection. Thus, the transfer of thermal energy is a function of many factors including but not limited to time, the thermal conductivity k of the medium through which the thermal energy is transferred, the temperature T1 of the exemplary first fin ring 145, the temperature T2 of exemplary second fin ring 155, the area A of the plane through which the thermal energy is transferred, and the thickness D of the medium through which the thermal energy must flow.

The conduction of thermal energy or heat from the exemplary first fin ring 145 to the exemplary second fin ring 155 can be expressed by the following equation:

$$Q=kA(T1-T2)/D$$

where Q is the amount of heat conducted in time t, k is the thermal conductivity of the medium through which the heat is transferred, T1 is the temperature of the exemplary first fin ring 145, T2 is the temperature of the exemplary second fin ring 155, A is the area of the plane through which the heat is transferred, and D is the thickness of the medium through which the heat must flow. Note that the total amount of thermal energy or heat transferred also includes an amount of thermal energy transferred by radiation and convection which is not included in the foregoing equation.

In the arrangement of the exemplary first and second fin rings 145, 155 shown in FIG. 8, the thermal conductivity k of the medium is the thermal conductivity of the air disposed in the gap G between the exemplary first and second fin rings 145, 155. The area A is defined as the surface area of a portion of the exemplary first fin ring 145 that transfers thermal energy to an identically sized surface area on a portion of the exemplary second fin ring 155 along a discrete portion of the lineal length of the exemplary first and second fin rings 145, 155. The thickness of the medium D is the distance D defined by the gap G between the exemplary first and second fin rings 145, 155.

In one embodiment of the invention, the transfer of thermal energy from the exemplary first fin ring 145 to the exemplary second fin ring 155 begins by thermal energy being transferred from the surface of the exemplary first fin ring 145. The thermal energy was conducted to the exemplary first fin ring 145 by conduction from the first substrate 140. The thermal energy could be generated by a plurality of heat generating devices 130 (FIG. 2) disposed on the second or upper side surface 142 (FIG. 2) of the first substrate 140. The thermal energy from the surface of the exemplary first fin ring 145 is transferred by a combination of conduction, convection and radiation to the exemplary second fin ring 155 where it is absorbed. The thermal energy is further conducted by the exemplary second fin ring 155 to the second substrate 150 which transfers the thermal energy to another medium through a heat sink or other means. In another embodiment of the invention, the thermal energy could be removed by a cooling loop 180 that passes through the second substrate 150. Since the thermal conductivity k of the air varies according to altitude, equipment designers may have to use larger fin heights H at higher altitudes to transfer an equivalent amount of thermal energy.

Figure 9:
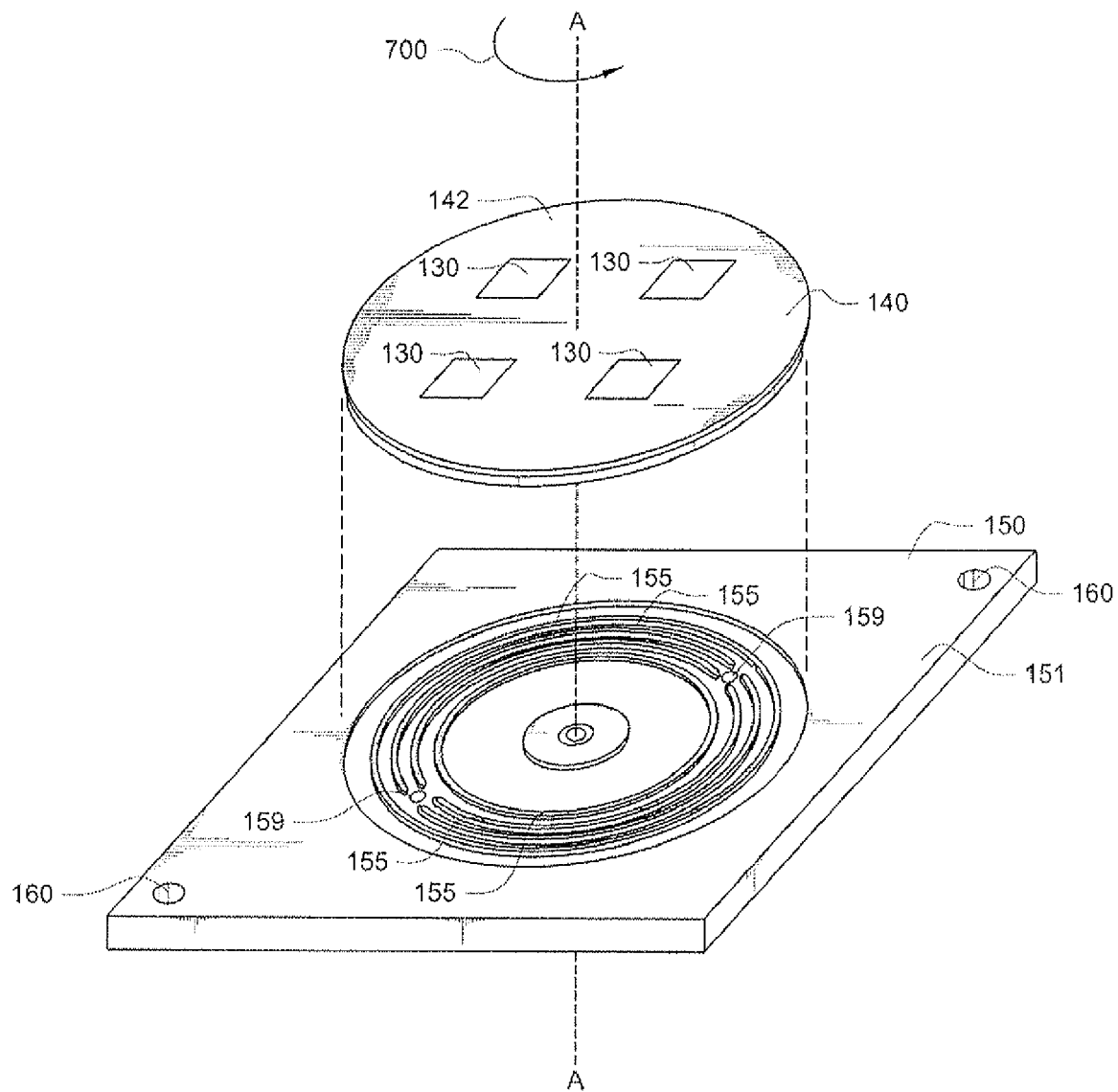
FIG. 9 is an elevated exploded perspective view of another embodiment of the apparatus of FIG. 1.

Still referring to FIG. 8, and now to FIG. 9, shown is another embodiment of the invention wherein there are first ports 160 for introducing moving air into the gap G between adjacent first fin rings 145 and second fin rings 155. As discussed, the apparatus 100 is comprised of a first substrate 140 rotatably connected to a second substrate 150. There is a plurality of thermal energy generating devices 130 disposed on the second or upper side surface 142 of the first substrate 140. The plurality of thermal energy generating devices 130 generate thermal energy which must be removed from the first substrate 140. It is desirable to introduce moving air into the gap G between adjacent first fin rings 145 and second fin rings 155 to provide for forced convection of thermal energy therebetween. This is desirable in ground and atmospheric applications because of the generally overall poor conductivity of air including the air in gap G. It is highly desirable in space applications because there is no air in gap G in the vacuum of space and hence no conduction or natural convection. As a result, without introducing moving air into the gap G in space to provide for forced convection, thermal energy transfer occurs by radiation alone which is limited in effectiveness and efficiency.

There is a plurality of first fin rings 145 (identical to those shown in FIG. 3) partially comprising the non-contacting thermal rotary joint formed concentrically on a first or lower surface side 141 (not shown) of the first substrate 140 directly beneath the plurality of electronic components 130. A plurality of second fin rings 155 also partially comprising the non-contacting thermal rotary joint is formed on a first side or upper surface 151 of the second substrate 150 which interleave with the plurality of first fin rings 145 (FIG. 3). The plurality of first fin rings 145 (FIG. 3) interleave with the plurality of second fin rings 155 such that the rotation of the first substrate 140 relative to the second substrate 150 about axis A-A is unobstructed.

One of the first ports 160 is disposed on the second substrate 150 diagonally opposed from the other first port 160. The first ports 160, 160 are in fluid communication with the gap G between adjacent fins of the plurality of first fin rings 145 and the plurality of second fin rings 155 through a channel (not shown but similar to FIG. 7) formed in the second substrate 150. The channel (not shown) is in fluid communication with a third port 159 defining an opening into the gap G defined between the plurality of second fin rings 155. The moving air is distributed in both the clockwise direction and counter-clockwise direction (similar to FIG. 6).

As the moving air has traveled in a circumferential path between the gap G between the adjacent first and second fin rings 145, 155, the moving air bleeds over the top edges 145a, 155a of the respective interleaving plurality of first fin rings 145 and the plurality of second fin rings 155 and exhausts to the atmosphere or the vacuum of space. Each of the plurality of first fin rings 145 and the plurality of second fin rings 155 are of a predetermined height H and have a top edge 145a, 155a, respectively. The radial leak rate can be varied by varying or staggering the predetermined fin height H and the clearance C between the first or top edge 145a of the plurality of first fin rings 145 and the first or upper side surface 151 of the second substrate 150 and the clearance C between the first or top edge 155a of the plurality of fin rings 155 and the second or lower side surface 141 of the first substrate 140. Thus, the height H of the first fin ring 145 (FIG. 5) nearest the spindle 143 (FIG. 5) could be of a different height H than the next adjacent first fin ring 145 (FIG. 5). The next adjacent first fin ring 145 (FIG. 5) could be of a different height H than the previous first fin ring 145 (FIG. 5). In this manner, all of the plurality of first fin rings 145 (FIG. 5) are of a different height H extending radially outward from the first fin ring 145 (FIG. 5) adjacent to the spindle 143 to the radially outer most fin ring 145 (FIG. 5).

Similarly, the height H of the second fin ring 155 (FIG. 5) nearest the hub 153 (FIG. 5) could be of a different height H than the next adjacent second fin ring 155 (FIG. 5). The next adjacent second fin ring 155 (FIG. 5) could be of a different height H than the previous second fin ring 155 (FIG. 5). In this manner, all of the plurality of second fin rings 155 (FIG. 5) are of a different height H extending radially outward from the second fin ring 155 (FIG. 5) adjacent the hub 153 (FIG. 5) to the radially outer most second fin ring 155 (FIG. 5).

Figure 10:
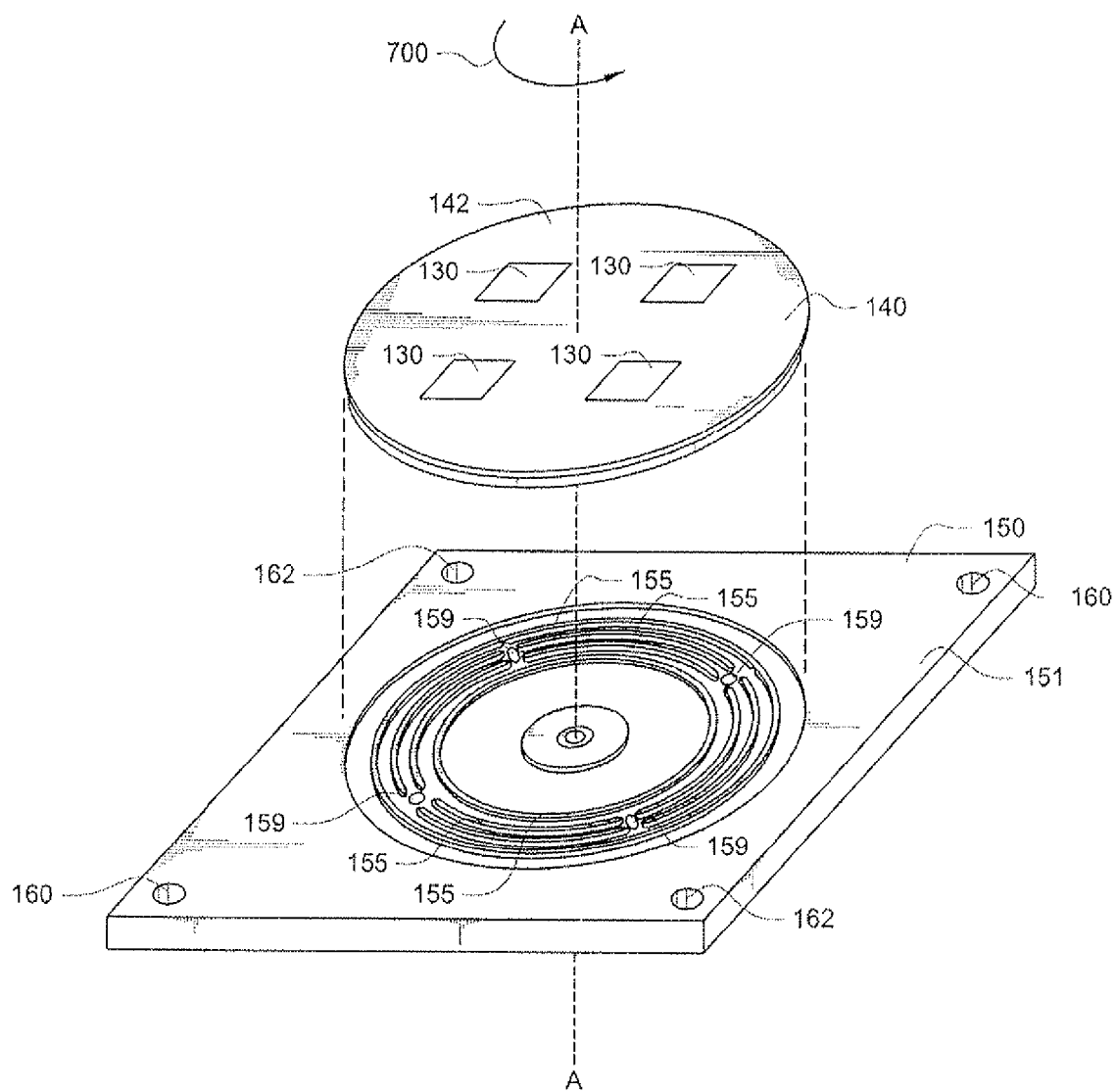
FIG. 10 is an elevated exploded perspective view of another embodiment of the apparatus of FIG. 1.

Still referring to FIGS. 8 and 9, and now to FIG. 10, shown is another embodiment of the invention wherein there are two first ports 160 defined in the second substrate 150 which introduce moving air to the gap G between the plurality of first fin rings 145 and the plurality of second fin rings 155. One of the first ports 160 is located on the second substrate 150 diagonally opposed from the other first port 160. In addition, there are two second ports 162 defined in the second substrate 150. One of the second ports 162 is located on the second substrate 150 diagonally opposed to the other second port 162.

As discussed, the apparatus 100 is comprised of a first substrate 140 rotatably connected to a second substrate 150. There is a plurality of thermal energy generating devices 130 disposed on the second or upper side surface 142 of the first substrate 140. The plurality of thermal energy generating devices 130 generate thermal energy which must be removed from the first substrate 140.

There is a plurality of first fin rings 145 (identical to those shown in FIG. 3) partially comprising the non-contacting thermal rotary joint formed concentrically on a first or lower surface side 141 (not shown) of the first substrate 140 directly beneath the plurality of thermal energy generating devices 130. A plurality of second fin rings 155 also partially comprising the non-contacting thermal rotary joint is formed on a first side or upper surface 151 of the second substrate 150 which interleave with the plurality of first fin rings 145 (FIG. 3). The plurality of first fin rings 145 (FIG. 3) interleave with the plurality of second fin rings 155 such that the rotation of the first substrate 140 relative to the second substrate 150 about axis A-A is unobstructed.

Each of the first ports 160, 160 and the second ports 162, 162 are in fluid communication with the gap G defined between the first and second plurality of fins 145, 155. The first ports 160, 160 are in fluid communication with the gap G between adjacent plurality of first fin rings 145 and the plurality of second fin rings 155 channels formed in second substrate 150 (not shown but similar to FIG. 7). The channels (not shown) are in fluid communication with third ports 159 defining an opening into gap G between the plurality of first fins 154 (FIG. 3) and the plurality of second fins 155. The moving air is distributed in the clockwise direction and the counter-clockwise direction (similar to FIG. 6).

The moving air introduced at the first ports 160, 160 flows through the gap G between the adjacent first and second fin rings 145, 155 one-quarter of the circumference of the second fin ring 155 before exiting therefrom through the adjacent second ports 162, 162, respectively.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:
1. A thermally conducting rotary joint, comprising:
a first substrate having a first side surface;
a second substrate having a first side surface, said first substrate being rotatably coupled to said second substrate and said first side surface of said first substrate is disposed adjacent to the first side surface of said second substrate;
a plurality of first fin rings defined concentrically on said first side surface of said first substrate;
a plurality of second fin rings defined concentrically on a first side surface of said second substrate, said plurality of second fin rings configured to interleave with said plurality of first fin rings and move relative to said plurality of first fin rings, said plurality of second fin rings being oriented adjacent to and substantially parallel to said plurality of first fin rings with a gap defined by and disposed between said plurality of first fin rings and said plurality of second fin rings, said plurality of first fin rings and said plurality of second fin rings defining a thermal path between said first substrate and said second substrate;
at least a first port defined in the second substrate configured for delivering moving air to said gap, wherein said gap is unobstructed in both the clockwise direction and the counter-clockwise direction from said first port, to provide distribution of said moving air in both the clockwise direction and the counter-clockwise direction around said plurality of first fin rings and said plurality of second fin rings; and
wherein each of said plurality of first fin rings and said plurality of second fin rings has a predetermined height and the predetermined height is varied between said adjacent first and second fin rings to vary the radial leak rate of the moving air.

2. The rotary joint of claim 1, further comprising a thermal transfer means configured for transferring thermal energy across said gap from said plurality of first fin rings to said plurality of second fin rings through convection and radiation.

3. The rotary joint of claim 2, further comprising a moving air source coupled to said first port and configured for communicating said moving air to at least said first port.

4. The rotary joint of claim 2, wherein said second substrate defines at least a second port configured for exhausting the moving air from said plurality of gaps.

5. The rotary joint of claim 4, wherein each of said plurality of first fin rings and said plurality of second fin rings has a first edge configured for allowing moving air to exit a gap of said plurality of gaps by radially bleeding over said first edges.

6. The rotary joint of claim 1, wherein said first substrate comprises a second side surface wherein heat generating devices are disposed.

7. The rotary joint of claim 1, wherein said second substrate has a cooling loop defined therein configured for circulating a cooling fluid for removing heat from said second substrate.

8. The rotary joint of claim 1, wherein said second substrate is thermally coupled to a heat sink.

9. A thermally conducting rotary joint, comprising:
a first substrate having a first side surface;
a second substrate having a first side surface, said first substrate being rotatably coupled to said second substrate and said first side surface of said first substrate is disposed adjacent to the first side surface of said second substrate;
at least a first fin ring defined concentrically on said first side surface of said first substrate;
at least a second fin ring defined concentrically on a first side surface of said second substrate, said second fin ring configured to interleave with said first fin ring and move relative to said first fin ring, said second fin ring being oriented adjacent to and substantially parallel to said first fin ring with a gap defined by and disposed between said at least first fin ring and said at least second fin ring, said first fin ring and said second fin ring defining a thermal path between said first substrate and said second substrate;
at least a first port defined in the second substrate configured for delivering moving air to said gap, wherein said gap is unobstructed in both the clockwise direction and the counter-clockwise direction from said first port, to provide distribution of said moving air in both the clockwise direction and the counter-clockwise direction around said at least first fin ring and said at least second fin ring; and
a thermal transfer means configured for transferring thermal energy across said gap from said first fin ring to said second fin ring through convection and radiation;
wherein at least one second fin ring includes at least one discontinuity that provides a gas passageway in a radial direction through said second fin ring, said gas passageway adjacent to the first port,
wherein said second substrate defines at least a second port configured for exhausting the moving air from said gap,
wherein said at least first fin ring is a plurality of first fin rings and said second fin ring is a plurality of second fin rings, and each of said first fin rings and said second fin rings have a first edge configured for allowing moving air to exit said gap by radially bleeding over said first edges, and
wherein said first fin rings and said second fin rings each have a predetermined height and the predetermined height is varied between adjacent first fin rings and second fin rings to vary the radial leak rate of the moving air.

10. A thermally conducting rotary joint, comprising:
a first substrate having a first side surface;
a second substrate having a first side surface, said first substrate being rotatably coupled to said second substrate and said first side surface of said first substrate is disposed adjacent to the first side surface of said second substrate;
a plurality of first fin rings defined concentrically on said first side surface of said first substrate;
a plurality of second fin rings defined concentrically on a first side surface of said second substrate, said plurality of second fin rings configured to interleave with said plurality of first fin rings and move relative to said plurality of first fin rings, said plurality of second fin rings being oriented adjacent to and substantially parallel to said plurality of first fin rings with a gap defined by and disposed between said plurality of first fin rings and said plurality of second fin rings, said plurality of first fin rings and said plurality of second fin rings defining a thermal path between said first substrate and said second substrate;
at least a first port defined in said second substrate configured for delivering moving air to said gap, wherein said gap is unobstructed in both the clockwise direction and the counter-clockwise direction from said first port, to provide distribution of said moving air in both the clockwise direction and the counter-clockwise direction around said plurality of first fin rings and said plurality of second fin rings; and
wherein each of said plurality of first fin rings and said plurality of second fin rings has a predetermined height and the predetermined height is varied between said adjacent first and second fin rings to vary the radial leak rate of the moving air.

11. The rotary joint of claim 10, further comprising a thermal transfer means configured for transferring thermal energy across said gap from said plurality of first fin rings to said plurality of second fin rings by convection and radiation.

12. The rotary joint of claim 10, further comprising a moving air source coupled to said first port and configured for communicating moving air to at least said first port.

13. The rotary joint of claim 10, further comprising at least a second port defined in said second substrate configured for exhausting the moving air from said gap.

14. The rotary joint of claim 10, wherein said plurality of first fin rings and said plurality of second fin rings each have a first edge configured for allowing the moving air to exit said gap by radially bleeding over said first edges.

15. The rotary joint of claim 10, wherein said first substrate comprises a second side surface wherein heat generating devices are disposed.

16. The rotary joint of claim 10, wherein said plurality of first fin rings are disposed between adjacent ones of said plurality of second fin rings.

17. A thermally conducting rotary joint, comprising:
a first substrate having a first side surface;
a second substrate having a first side surface, said first substrate being rotatably coupled to said second substrate and said first side surface of said first substrate is disposed adjacent to the first side surface of said second substrate;
a plurality of first fin rings defined concentrically on said first side surface of said first substrate;
a plurality of second fin rings defined concentrically on a first side surface of said second substrate, said second fin rings configured to interleave with said first fin rings and move relative to said first fin rings, said second fin rings being oriented adjacent to and substantially parallel to said first fin rings with a gap defined by and disposed between said first fin rings and said second fin rings, said first fin rings and said second fin rings defining a thermal path between said first substrate and said second substrate;

at least a first port defined in said second substrate configured for delivering moving air to said gap, wherein said gap is unobstructed in both the clockwise direction and the counter-clockwise direction from said first port, to provide distribution of said moving air in both the clockwise direction and the counter-clockwise direction around said plurality of first fin rings and said plurality of second fin rings; and wherein at least one second fin ring includes at least one discontinuity that provides a gas passageway in a radial direction through said second fin ring, said gas passageway adjacent to the first port, wherein said first fin rings and said second fin rings each have a first edge configured for allowing the moving air to exit said gap by radially bleeding over said first edges, and wherein said first fin rings and said second fin rings each have a predetermined height and the predetermined height is varied between adjacent first fin rings and said second fin rings to vary the radial leak rate of the moving air.

18. A thermally conducting rotary joint, comprising:
a first substrate having a first side surface;
a second substrate having a first side surface, said first substrate being rotatably coupled to said second substrate and said first side surface of said first substrate is disposed adjacent to the first side surface of said second substrate;
at least a first fin ring defined concentrically on said first side surface of said first substrate;
at least a second fin ring defined concentrically on a first side surface of said second substrate, said second fin ring configured to interleave with said first fin ring and move relative to said first fin ring, said second fin ring being oriented adjacent to and substantially parallel to said first fin ring with a gap defined by and disposed between said at least first fin ring and said at least second fin ring, said first fin ring and said second fin ring defining a thermal path between said first substrate and said second substrate; and
at least a first port defined in the second substrate configured for delivering moving air to said gap, wherein said gap is unobstructed in both the clockwise direction and the counter-clockwise direction from said first port, to provide distribution of said moving air in both the clockwise direction and the counter-clockwise direction around said at least first fin ring and said at least second fin ring;

wherein at least one second fin ring includes at least one discontinuity that provides a gas passageway in a radial direction through said second fin ring, said gas passageway adjacent to the first port, and wherein said discontinuity comprises a tapered portion of said second fin ring, the tapered portion tapered in a lateral direction parallel to said first side surface of said second substrate.

19. The rotary joint of claim 1, wherein said plurality of first fin rings are disposed between adjacent ones of second fin rings.

20. A thermally conducting rotary joint, comprising:
a first substrate having a first side surface;
a second substrate having a first side surface, said first substrate being rotatably coupled to said second substrate and said first side surface of said first substrate is disposed adjacent to the first side surface of said second substrate;
a plurality of first fin rings defined concentrically on said first side surface of said first substrate;
a plurality of second fin rings defined concentrically on a first side surface of said second substrate, said second fin rings configured to interleave with said first fin rings and move relative to said first fin rings, said second fin rings being oriented adjacent to and substantially parallel to said first fin rings with a gap defined by and disposed between said first fin rings and said second fin rings, said first fin rings and said second fin rings defining a thermal path between said first substrate and said second substrate; and
at least a first port defined in said second substrate configured for delivering moving air to said gap, wherein said gap is unobstructed in both the clockwise direction and the counter-clockwise direction from said first port, to provide distribution of said moving air in both the clockwise direction and the counter-clockwise direction around said plurality of first fin rings and said plurality of second fin rings;

wherein at least one second fin ring includes at least one discontinuity that provides a gas passageway in a radial direction through said second fin ring, said gas passageway adjacent to the first port, and wherein said discontinuity comprises a tapered portion of said second fin ring, the tapered portion tapered in a lateral direction parallel to said first side surface of said second substrate.

* * * * *